US007467196B2

(12) United States Patent
Di Luoffo et al.

(10) Patent No.: US 7,467,196 B2
(45) Date of Patent: Dec. 16, 2008

(54) MANAGING NETWORK ERRORS COMMUNICATED IN A MESSAGE TRANSACTION WITH ERROR INFORMATION USING A TROUBLESHOOTING AGENT

(75) Inventors: Vincent Valentino Di Luoffo, Sandy Hook, CT (US); Craig William Fellenstein, Brookfield, CT (US); Rick Allen Hamilton, II, Charlottesville, VA (US); Joshy Joseph, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 538 days.

(21) Appl. No.: 11/034,304

(22) Filed: Jan. 12, 2005

(65) Prior Publication Data
US 2006/0167828 A1 Jul. 27, 2006

(51) Int. Cl.
*G06F 15/173* (2006.01)
(52) U.S. Cl. .................................. 709/223
(58) Field of Classification Search ............ 706/60; 714/37, 39; 709/223
See application file for complete search history.

(56) References Cited

U.S. PATENT DOCUMENTS

| 4,591,980 | A | 5/1986 | Huberman et al. | 712/16 |
| 5,325,525 | A | 6/1994 | Shan et al. | 718/104 |
| 5,630,156 | A | 5/1997 | Privat et al. | 712/14 |
| 5,729,472 | A | 3/1998 | Seiffert et al. | |
| 5,931,911 | A | 8/1999 | Remy et al. | 709/223 |
| 5,978,583 | A | 11/1999 | Ekanadham et al. | 717/106 |
| 6,134,680 | A | 10/2000 | Yeomans | 714/57 |

(Continued)

FOREIGN PATENT DOCUMENTS

CN 1336054 2/2002

(Continued)

OTHER PUBLICATIONS

Foster et al.; The Anatomy of the Grid, Enabling Scalable Virtual Organizations; available at www.globus.org/research/papers/anatomy.pdf as of Nov. 27, 2003.

(Continued)

*Primary Examiner*—Jeffrey Pwu
*Assistant Examiner*—Farhad Ali
(74) *Attorney, Agent, or Firm*—Matthew W. Baca; Amy J. Pattillo (57) ABSTRACT

A method for managing network errors communicated in a message transaction with error information using a troubleshooting agent. A network facilitates message transactions between a requester and a responder for facilitating web services. When a non-application specific error occurs in relation to a particular message transaction, such as a network error, a protocol layer assigns an error code and either the requester or responder encodes the error code in the body of an envelope added to the particular message transaction. The message transaction is an XML message with a Simple Object Access Protocol (SOAP) envelope encoded with the error code to which the XML message is then attached. The error encoded message transaction is forwarded to a troubleshooting agent. The troubleshooting agent facilitates resolution of the non-application specific error and returns a descriptive message indicating the resolution of the non-application specific error to at least one of the requester and the responder.

6 Claims, 7 Drawing Sheets

U.S. PATENT DOCUMENTS

| | | | |
|---|---|---|---|
| 6,397,197 B1 | 5/2002 | Gindlesperger | 705/37 |
| 6,438,704 B1 | 8/2002 | Harris et al. | 713/502 |
| 6,453,376 B1 | 9/2002 | Fairman et al. | 710/240 |
| 6,671,676 B1 | 12/2003 | Shacham | 705/37 |
| 6,681,251 B1 | 1/2004 | Leymann et al. | 709/226 |
| 6,748,416 B2 | 6/2004 | Carpenter et al. | 709/202 |
| 2002/0057684 A1 | 5/2002 | Miyamoto et al. | 370/386 |
| 2002/0165979 A1 | 11/2002 | Vincent | 709/239 |
| 2003/0036886 A1 | 2/2003 | Stone | |
| 2003/0110419 A1* | 6/2003 | Banerjee et al. | 714/43 |
| 2003/0112809 A1 | 6/2003 | Bharalietal. | 370/400 |
| 2003/0115099 A1 | 6/2003 | Burns et al. | 705/14 |
| 2003/0145084 A1 | 7/2003 | McNerney | 709/224 |
| 2003/0204485 A1 | 10/2003 | Triggs | 707/1 |
| 2004/0078471 A1 | 4/2004 | Yang | 709/227 |

FOREIGN PATENT DOCUMENTS

| | | |
|---|---|---|
| EP | 0790559 A | 8/1997 |
| EP | 1109353 A2 | 6/2001 |
| EP | 1267552 A | 12/2002 |
| WO | 0074313 A1 | 7/2000 |
| WO | WO 03067494 A1 | 8/2003 |

OTHER PUBLICATIONS

Foster et al.; The Physiology of the Grid, An Open Grid Services Architecture for Distributed Systems Integration; available at www.globus/org/research/papers/ogsa.pdf as of Nov. 27, 2003.

Foster, Ian; What is the Grid? A Three Point Checklist; available at www-fp.mcs.anl.gov/~foster/Articles/WhatIsTheGrid.pdf as of Nov. 27, 2003.

Ferreira et al.; IBM Redpaper—Globus Toolkit 3.0 Quick Start; available at www.redbooks.ibm.com/redpapers/pdfs/redp369 as of Nov. 27, 2003.

IBM Grid Computing—What is Grid Computing; available at www-1.ibm.com/grid/about_grid/what_is.shtml as of Nov. 27, 2003.

Berstis, Viktors; IBM Redpaper—Fundamentals of Grid Computing; available at www.redbooks.ibm.com/redpapers/pdfs/redp3613.pdf as of Nov. 27, 2003.

Jacob, Bart; IBM Grid Computing—Grid Computing: What are the key components?; available at www-106.ibm.com/developerworks/grid/library/gr-overview/ as of Nov. 27, 2003.

Unger et al.; IBM Grid Computing—A Visual Tour of Open Grid Services Architecture; available at www-106.ibm.com/developerworks/grid/library/gr-visual/ as of Nov. 27, 2003.

Edited by Rajkumar Buyya; Grid Computing Info Centre: Frequently Asked Questions (FAQ); available at http://www.cs.mu.oz.au/~raj/GridInfoware/ gridfaq.html as of Nov. 27, 2003.

Research Disclosure, "Error Handling in a Synchronous Dataflow Network", International Journal, Dec. 1998, Article No. 416140, p. 1712, vol. 41, No. 416, copyright International Business Machines Corporation.

IBM Technical Disclosure Bulletin, "Error-Handling Mechanism for Automated Problem Determination Service Agents on IBM Local Area Network Server Network", vol. 39, No. 10, pp. 191-192, published Oct. 1996, copyright International Business Machines Corporation.

Massie ML et al, "The Ganglia Distributed Monitoring System: Design, Implementation, and Experience" Parallel Computing Elsevier Netherlands, vol. 30, No. 7, Jul. 2004, pp. 817-840.

Fenglian XU et al, "Tools and Support for Deploying Applications on the Grid" Services Computing, 2004. Proceedings 2004 International Conference on Shanghai, China, Sep. 15-18, 2004, Piscataway, NJ, IEEE, pp. 281-287.

Ian Foster and Carl Kesselman, "Grid2—Blueprint for a New Computing Infrastructure" 2004, Elsevier, San Francisco, CA, chapter 20, Instrumentation and Monitoring, pp. 319-343.

Smallen S et al, "The Inca Test Harness and Reporting Framework" Supercomputing 2004. Proceedings of the ACM/IEEE SC2004 Conference Pittsburgh, PA, Nov. 2004, p. 1-10.

Allen G, et al., "The Cactus Worm: Experiments with Dynamic Resource Discovery and Allocation in a Grid Environment", International Journal of High Performance Computing Applications, Sage Science Press, Thousand Oaks, US, vol. 15, No. 4, 2001, pp. 345-358.

Hwa Min Lee, "A Fault Tolerance Service for QoS in Grid Computing", Lecture Notes in Computer Science, vol. 2659, Aug. 2003, pp. 286-296.

Tianyi Zang, et al., "The Design and Implementation of an OGSA-based grid information service" Web Services, 2004. Proceedings IEEE International Conference on San Diego CA, Piscataway, NJ, IEEE, Jul. 6, 2004, pp. 566-573.

Sample N, et al., "Scheduling Under Uncertainty: Planning for the Ubiquitous Grid", Coordination Models and Languages, 5th International Conference, Coordination 2002. Proceedings (Lecture Notes in Computer Science, vol. 2315) Springer-Varlag Berlin, Germany, 2002, pp. 300-316.

Gever DH, et al, "WWW-based high performance computing support of acoustic matched field processing", MTS/IEEE Oceans 2001. An Ocean Odessey. Conference Proceedings (IEEE Cat. No. 01CH37295) Marine Technology Soc. Washington, DC, vol. 4, 2001, pp. 2541-2548.

Chase, JS et al, "Dynamic Virtual Clusters in a Grid Site Manager", High Performance Distributed Computing 2003. Proceedings. 12th IEEE International Symposium, Jun. 22-24, 2003, Piscataway, NJ, USA, IEEE, pp. 90-100.

"Method of Providing On-Demand-Computing for Server Blades", IP.com Journal, IP.com Inc., West Henrietta, NY, US, Sep. 8, 2003, p. 1.

Kubicek, C, et al., "Dynamic Allocation of Servers to Jobs in a Grid Hosting Environment", by Technology Journal, vol. 22, No. 3, Jul. 2004, pp. 251-260.

Yang, Kun, et al, "Network Engineering Towards Efficient Resource On-Demand in Grid Computing", Communication Technology Proceedings, 2003, ICCT 2003, International Conference on Apr. 9-11, 2003, Piscataway, NJ, USA, IEEE, vol. 2, Apr. 9, 2003, pp. 1715-1718.

* cited by examiner

```
<?xml version="1.0" encoding="UTF-8"?>
<errorRules>
        <ProtocolType name="HTTP">
                <httpError value="404: Not found">
                        <alternateNodeName
                                hostName= "testCommunicationsServer"
                                serviceName= "newService">
                        </alternateNodeName>
                </httpError>
                <httpError value="404: Not found">
                        <troubleShooter name="TCPPingAgent">
                        </troubleShooter>
                </httpError>
        <ProtocolType name="TCP">
        </ProtocolType>
        </ProtocolType>
</errorRules>
```

```
POST/EXAMPLE HTTP/1.1
HOST: WWW.EXAMPLESERVER.COM
Content-Type: charset= "UTF-8"                                    800
Content-Length: nnnn
SOAPAction: "Some-URI"
<SOAP-ENV: Envelope
       xmlns:SOAP-ENV="http://schemas.xmlsoap.org/soap/envelope/"        ⎤ 802
       SOAP-ENV:encodingStyle="http://schemas.xmlsoap.org/soap/encoding/">
 804      <SOAP-ERR:errorRecoveryAgent=http://hostname.com/soap/error/>   ⎦
   <SOAP-ENV:Body>
       <SOAP-ENV: Fault>
 806       <SOAP-ENV: Code>                                          808
              <SOAP-ENV:Value> env:sender </SOAP-ENV:Value>
              <SOAP-ENV:Subcode>                                     810
                  <SOAP-ENV: Value> HTTP:404 </SOAP-ENV: Value>
              </SOAP-ENV:Subcode>
           <SOAP-ENV: Code>
           <SOAP-ENV: Reason>                                        812
              <SOAP-ENV:Text xml:lang="en"> Not found</SOAP-ENV:Text>
           </SOAP-ENV: Reason>
       </SOAP-ENV: Fault>
   </SOAP-ENV:Body>
</SOAP-ENV:Envelope>
```

MANAGING NETWORK ERRORS COMMUNICATED IN A MESSAGE TRANSACTION WITH ERROR INFORMATION USING A TROUBLESHOOTING AGENT

BACKGROUND OF THE INVENTION

1. Technical Field

The present invention relates in general to improved network error management and in particular to automated self-healing within a grid environment. Still more particularly, the present invention relates to managing network errors communicated in an XML message transaction using a troubleshooting agent.

2. Description of the Related Art

Ever since the first connection was made between two computer systems, new ways of transferring data, resources, and other information between two computer systems via a connection continue to develop. In typical network architectures, when two computer systems are exchanging data via a connection, one of the computer systems is considered a client sending requests and the other is considered a server processing the requests and returning results. In an effort to increase the speed at which requests are handled, server systems continue to expand in size and speed. Further, in an effort to handle peak periods when multiple requests are arriving every second, server systems are often joined together as a group and requests are distributed among the grouped servers. Multiple methods of grouping servers have developed such as clustering, multi-system shared data (sysplex) environments, and enterprise systems. With a cluster of servers, one server is typically designated to manage distribution of incoming requests and outgoing responses. The other servers typically operate in parallel to handle the distributed requests from clients. Thus, one of multiple servers in a cluster may service a client request without the client detecting that a cluster of servers is processing the request.

Typically, servers or groups of servers operate on a particular network platform, such as Unix or some variation of Unix, and provide a hosting environment for running applications. Each network platform may provide functions ranging from database integration, clustering services, and security to workload management and problem determination. Each network platform typically offers different implementations, semantic behaviors, and application programming interfaces (APIs).

Merely grouping servers together to expand processing power, however, is a limited method of improving efficiency of response times in a network. Thus, increasingly, within a company network, rather than just grouping servers, servers and groups of server systems are organized as distributed resources. There is an increased effort to collaborate, share data, share cycles, and improve other modes of interaction among servers within a company network and outside the company network. Further, there is an increased effort to outsource nonessential elements from one company network to that of a service provider network. Moreover, there is a movement to coordinate resource sharing between resources that are not subject to the same management system, but still address issues of security, policy, payment, and membership. For example, resources on an individual's desktop are not typically subject to the same management system as resources of a company server cluster. Even different administrative groups within a company network may implement distinct management systems.

The problems with decentralizing the resources available from servers and other computing systems operating on different network platforms, located in different regions, with different security protocols and each controlled by a different management system, has led to the development of Grid technologies using open standards for operating a grid environment. Grid environments support the sharing and coordinated use of diverse resources in dynamic, distributed, virtual organizations. A virtual organization is created within a grid environment when a selection of resources, from geographically distributed systems operated by different organizations with differing policies and management systems, is organized to handle a job request. A grid vendor may develop a grid environment to which a buyer may submit grid jobs, for example.

The open standards for Grid technologies describe a grid architecture. In the grid architecture, physical resources are managed by web services and open standards enable interfacing between web services and grid services. Grid applications interface with grid services.

Currently, many services provided through the Internet are already implemented through web services. The basis of web service communication is the Extensible Markup Language (XML). XML technology functions on the premise that data freely flows between two points, referred to as the requester and the responder.

A problem with XML based web services, however, is that when the requester's request is not delivered to the responder destination, the requester does not have an ability to manage communication errors. In particular, error determination in XML transactions, referred to as message transactions, is typically handled at the protocol level. Errors handled at the protocol level, however, are typically assigned a generic error code that does not provide the responder with sufficient information to then handle the error or imposes on the application developer the responsibility to write applications that will respond to protocol level errors. In particular, requiring the responder application to handle non-application specific errors, such as a generic protocol based error indicating a network problem, is not advantageous.

For a grid environment to efficiently provide services, it would be advantageous for grid resources and grid services to self-heal. Thus, as more grid services are created that interface with web services, it would be advantageous for error handling of network errors and other non-application specific errors to occur at the web services level by an agent, rather than relying on the requester or responder applications to understand generic errors and it would be advantageous for the error handling to provide information and responses that are more detailed and facilitate network self-healing.

SUMMARY OF THE INVENTION

In view of the foregoing, an embodiment of the invention in general provides for network error management and in particular provides for automated self-healing within a grid environment. Still more particularly, the embodiment of the invention relates to managing network errors communicated in an XML message transaction as part of a web service using a troubleshooting agent.

In one embodiment of the invention, a network facilitates message transactions between a requester and a responder for facilitating web services. When a non-application specific error occurs in relation to a particular message transaction, such as a network error, a protocol layer assigns an error code and either the requester or responder encodes the error code in the body of an envelope added to the particular message transaction. In particular, the message transaction is an XML message with a Simple Object Access Protocol (SOAP) envelope encoded with the error code to which the XML message is then attached. The error encoded message transaction is forwarded to a troubleshooting agent. The troubleshooting agent facilitates resolution of the non-application specific error and returns a descriptive message indicating the resolution of the non-application specific error to at least one of the requester and the responder.

In facilitating resolution of the non-application specific error, the troubleshooting agent applies rules and policies according to message processing guidelines. Rules and policies specify the available responses to an error type and message processing guidelines indicate which of the available responses can be taken.

Message transactions occur at a web services layer in the grid environment architecture, such that by handling the error at the web services layer, grid services are not required to handle the error. The troubleshooting agent also pass the non-application specific error to a grid service that facilitates autonomic self-healing of the grid environment at the grid services level of the grid environment architecture.

BRIEF DESCRIPTION OF THE DRAWINGS

The novel features believed aspect of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
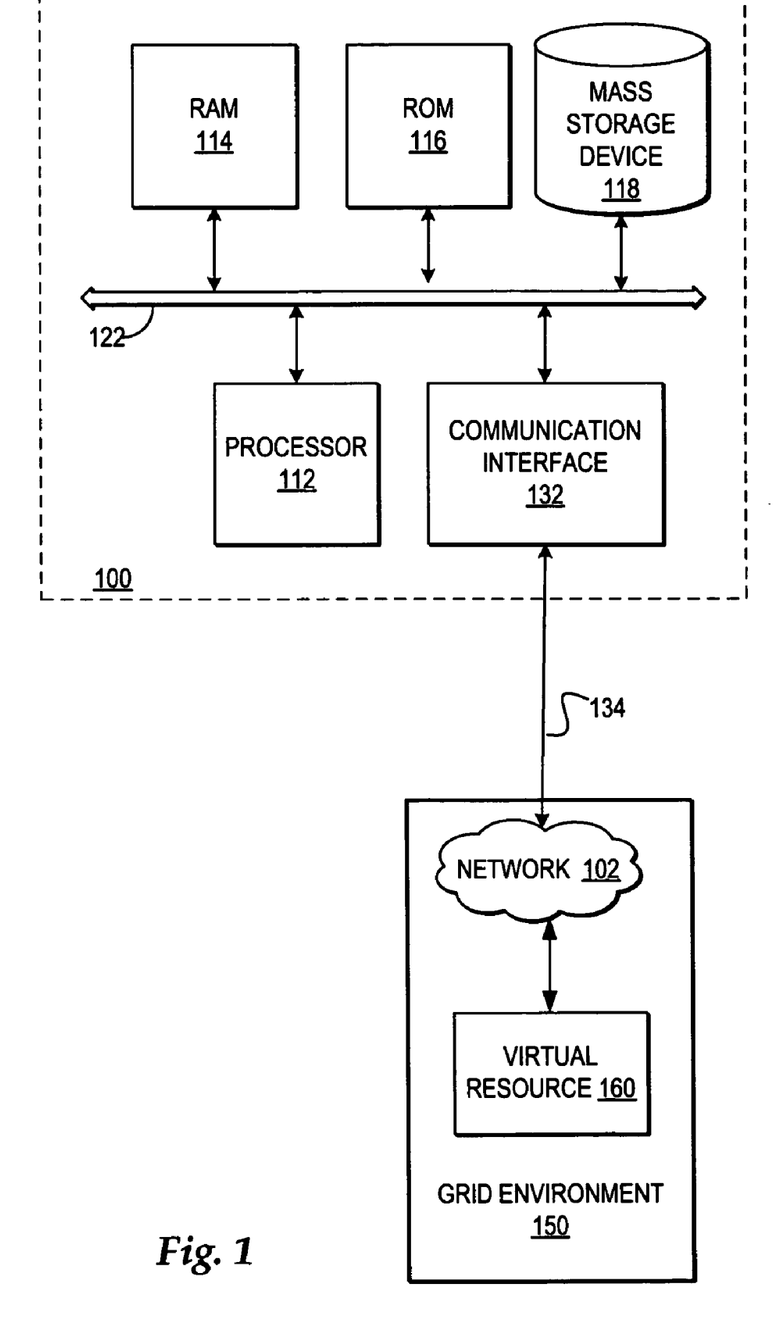
FIG. 1 depicts one embodiment of a computer system which may be implemented in a grid environment and in which the present invention may be implemented.

Referring now to the drawings and in particular to FIG. 1, there is depicted one embodiment of a computer system which may be implemented in a grid environment and in which the present invention may be implemented. As will be further described, the grid environment includes multiple computer systems managed to provide resources. Additionally, as will be further described, the present invention may be executed in a variety of computer systems, including a variety of computing systems, mobile systems, and electronic devices operating under a number of different operating systems managed within a grid environment.

In one embodiment, computer system 100 includes a bus 122 or other device for communicating information within computer system 100, and at least one processing device such as processor 112, coupled to bus 122 for processing information. Bus 122 may include low-latency and higher latency paths connected by bridges and adapters and controlled within computer system 100 by multiple bus controllers. When implemented as a server system, computer system 100 typically includes multiple processors designed to improve network servicing power.

Processor 112 may be a general-purpose processor such as IBM's PowerPC™ processor that, during normal operation, processes data under the control of operating system and application software accessible from a dynamic storage device such as random access memory (RAM) 114 and a static storage device such as Read Only Memory (ROM) 116. The operating system may provide a graphical user interface (GUI) to the user. In one embodiment, application software contains machine executable instructions that when executed on processor 112 carry out the operations depicted in the flowcharts of FIGS. 9 and 10 and others operations described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 100 to perform a process according to the present invention. The term "machine-readable medium" as used herein includes any medium that participates in providing instructions to processor 112 or other components of computer system 100 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the present embodiment, an example of a non-volatile medium is mass storage device 118 which as depicted is an internal component of computer system 100, but will be understood to also be provided by an external device. Volatile media include dynamic memory such as RAM 114. Transmission media include coaxial cables, copper wire or fiber optics, including the wires that comprise bus 122. Transmission media can also take the form of acoustic or light waves, such as those generated during radio frequency or infrared data communications.

Moreover, the present invention may be downloaded as a computer program product, wherein the program instructions may be transferred from a remote virtual resource, such as a virtual resource 160, to requesting computer system 100 by way of data signals embodied in a carrier wave or other propagation medium via a network link 134 (e.g. a modem or network connection) to a communications interface 132 coupled to bus 122. Virtual resource 160 may include a virtual representation of the resources accessible from a single system or systems, wherein multiple systems may each be considered discrete sets of resources operating on independent platforms, but coordinated as a virtual resource by a grid manager. Communications interface 132 provides a two-way data communications coupling to network link 134 that may be connected, for example, to a local area network (LAN), wide area network (WAN), or an Internet Service Provider (ISP) that provide access to network 102. In particular, network link 134 may provide wired and/or wireless network communications to one or more networks, such as network 102, through which use of virtual resources, such as virtual resource 160, is accessible as provided within a grid environment 150. Grid environment 150 may be part of multiple types of networks, including a peer-to-peer network, or may be part of a single computer system, such as computer system 100.

As one example, network 102 may refer to the worldwide collection of networks and gateways that use a particular protocol, such as Transmission Control Protocol (TCP) and Internet Protocol (IP), to communicate with one another. Network 102 uses electrical, electromagnetic, or optical signals that carry digital data streams. The signals through the various networks and the signals on network link 134 and through communication interface 132, which carry the digital data to and from computer system 100, are exemplary forms of carrier waves transporting the information. It will be understood that alternate types of networks, combinations of networks, and infrastructures of networks may be implemented.

When implemented as a server system, computer system 100 typically includes multiple communication interfaces accessible via multiple peripheral component interconnect (PCI) bus bridges connected to an input/output controller. In this manner, computer system 100 allows connections to multiple network computers.

Additionally, although not depicted, multiple peripheral components and internal/external devices may be added to computer system 100, connected to multiple controllers, adapters, and expansion slots coupled to one of the multiple levels of bus 122. For example, a display device, audio device, keyboard, or cursor control device may be added as a peripheral component.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
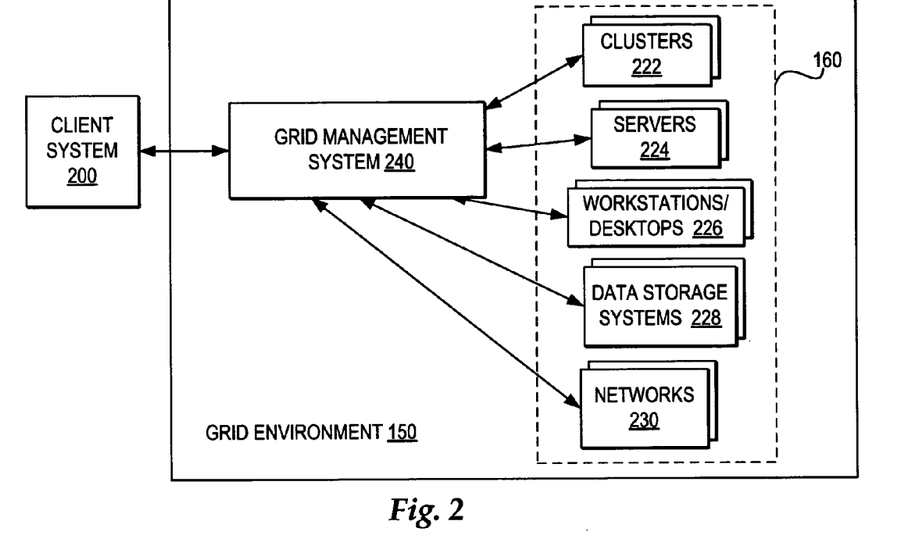
FIG. 2 is block diagram illustrating one embodiment of the general types of components within a grid environment.

With reference now to FIG. 2, a block diagram illustrates one embodiment of the general types of components within a grid environment. In the present example, the components of a grid environment 150 include a client system 200 interfacing with a grid management system 240 which interfaces with server clusters 222, servers 224, workstations and desktops 226, data storage systems 228, and networks 230. For purposes of illustration, the network locations and types of networks connecting the components within grid environment 150 are not depicted. It will be understood, however, that the components within grid environment 150 may reside atop a network infrastructure architecture that may be implemented with multiple types of networks overlapping one another. Network infrastructure may range from multiple large enterprise systems to a peer-to-peer system to a single computer system. Further, it will be understood that the components within grid environment 150 are merely representations of the types of components within a grid environment. A grid environment may simply be encompassed in a single computer system or may encompass multiple enterprises of systems.

The central goal of a grid environment, such as grid environment 150 is organization and delivery of resources from multiple discrete systems viewed as virtual resource 160. Client system 200, server clusters 222, servers 224, workstations and desktops 226, data storage systems 228, networks 230 and the systems creating grid management system 240 may be heterogeneous and regionally distributed with independent management systems, but enabled to exchange information, resources, and services through a grid infrastructure enabled by grid management system 240. Further, server clusters 222, servers 224, workstations and desktops 226, data storage systems 228, and networks 230 may be geographically distributed across countries and continents or locally accessible to one another.

In the example, client system 200 interfaces with grid management system 240. Client system 200 may represent any computing system sending requests to grid management system 240. In particular, client system 200 may send virtual job requests (or requests for a quote (RFQs) and jobs to grid management system 240. Further, while in the present embodiment client system 200 is depicted as accessing grid environment 150 with a request, in alternate embodiment's client system 200 may also operate within grid environment 150.

While the systems within virtual resource 160 are depicted in parallel, in reality, the systems may be part of a hierarchy of systems where some systems within virtual resource 160 may be local to client system 200, while other systems require access to external networks. Additionally, it is important to note, that systems depicted within virtual resources 160 may be physically encompassed within client system 200.

To implement grid environment 150, grid management system 240 facilitates grid services. Grid services may be designed according to multiple architectures, including, but not limited to, the Open Grid Services Architecture (OGSA). In particular, grid management system 240 refers to the management environment which creates a grid by linking computing systems into a heterogeneous network environment characterized by sharing of resources through grid services.

In particular, as will be further described, grid management system 240 may include agents and services that facilitate autonomic self-healing within grid environment 150 when errors occur at any level. In addition, as will be further described, one level of the grid architecture includes web services. When non-application specific errors occur in the delivery of message transactions occurring at the web services level, according to an advantage, the message transaction not properly delivered because of the error is attached to a SOAP envelope, where the SOAP envelope encodes the error. Then, the message transaction with error information is forwarded to a troubleshooting agent that facilitates error resolution. In facilitating error resolution, the troubleshooting agent may forward the message transaction with error information to one of the agents or services within grid management system 240 that facilitates autonomic self-healing to resolve the error.

Figure 3:
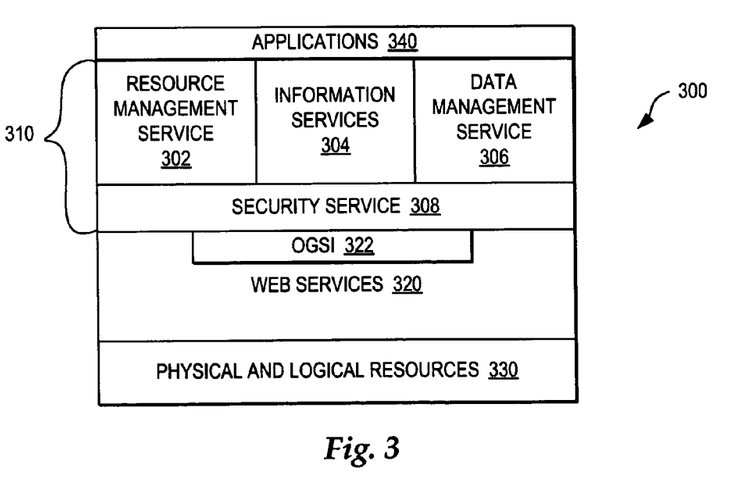
FIG. 3 is a block diagram illustrating one example of an architecture that may be implemented in a grid environment.

Referring now to FIG. 3, a block diagram illustrates one example of an architecture that may be implemented in a grid environment. As depicted, an architecture 300 includes multiple layers of functionality. As will be further described, the present invention is a process which may be implemented in one or more layers of an architecture, such as architecture 300, which is implemented in a grid environment, such as the grid environment described in FIG. 2. It is important to note that architecture 300 is just one example of an architecture that may be implemented in a grid environment and in which the present invention may be implemented. Further, it is important to note that multiple architectures may be implemented within a grid environment.

Within the layers of architecture 300, first, a physical and logical resources layer 330 organizes the resources of the systems in the grid. Physical resources include, but are not limited to, servers, storage media, and networks. The logical resources virtualize and aggregate the physical layer into usable resources such as operating systems, processing power, memory, I/O processing, file systems, database managers, directories, memory managers, and other resources.

Next, a web services layer 320 provides an interface between grid services 310 and physical and logical resources 330. Web services layer 320 implements service interfaces including, but not limited to, Web Services Description Language (WSDL), Simple Object Access Protocol (SOAP), and eXtensible mark-up language (XML) executing atop an Internet Protocol (IP) or other network transport layer. As will be further described, when the network transport layer returns an error code, web services layer 320 enhances the XML message transaction with a SOAP envelope describing the error code forwards the XML message transaction with error information to a troubleshooting agent.

Further, the Open Grid Services Infrastructure (OSGI) standard 322 builds on top of current web services 320 by extending web services 320 to provide capabilities for dynamic and manageable Web services required to model the resources of the grid. In particular, by implementing OGSI standard 322 with web services 320, grid services 310 designed using OGSA are interoperable. In alternate embodiments, other infrastructures or additional infrastructures may be implemented a top web services layer 320.

Grid services layer 310 includes multiple services, the combination of which may implement grid management system 240. For example, grid services layer 310 may include grid services designed using OGSA, such that a uniform standard is implemented in creating grid services. Alternatively, grid services may be designed under multiple architectures. Grid services can be grouped into four main functions. It will be understood, however, that other functions may be performed by grid services.

First, a resource management service 302 manages the use of the physical and logical resources. Resources may include, but are not limited to, processing resources, memory resources, and storage resources. Management of these resources includes scheduling jobs, distributing jobs, and managing the retrieval of the results for jobs. Resource management service 302 monitors resource loads and distributes jobs to less busy parts of the grid to balance resource loads and absorb unexpected peaks of activity. In particular, a user may specify preferred performance levels so that resource management service 302 distributes jobs to maintain the preferred performance levels within the grid.

Second, information services 304 manages the information transfer and communication between computing systems within the grid. Since multiple communication protocols may be implemented, information services 304 manages communications across multiple networks utilizing multiple types of communication protocols.

Third, a data management service 306 manages data transfer and storage within the grid. In particular, data management service 306 may move data to nodes within the grid where a job requiring the data will execute. A particular type of transfer protocol, such as Grid File Transfer Protocol (GridFTP), may be implemented.

Finally, a security service 308 applies a security protocol for security at the connection layers of each of the systems operating within the grid. Security service 308 may implement security protocols, such as Open Secure Socket Layers (SSL), to provide secure transmissions. Further, security service 308 may provide a single sign-on mechanism, so that once a user is authenticated, a proxy certificate is created and used when performing actions within the grid for the user.

Multiple services may work together to provide several key functions of a grid computing system. In a first example, computational tasks are distributed within a grid. Data management service 306 may divide up a computation task into separate grid services requests of packets of data that are then distributed by and managed by resource management service 302. The results are collected and consolidated by data management system 306. In a second example, the storage resources across multiple computing systems in the grid are viewed as a single virtual data storage system managed by data management service 306 and monitored by resource management service 302.

An applications layer 340 includes applications that use one or more of the grid services available in grid services layer 310. Advantageously, applications interface with the physical and logical resources 330 via grid services layer 310 and web services 320, such that multiple heterogeneous systems can interact and interoperate.

Figure 4:
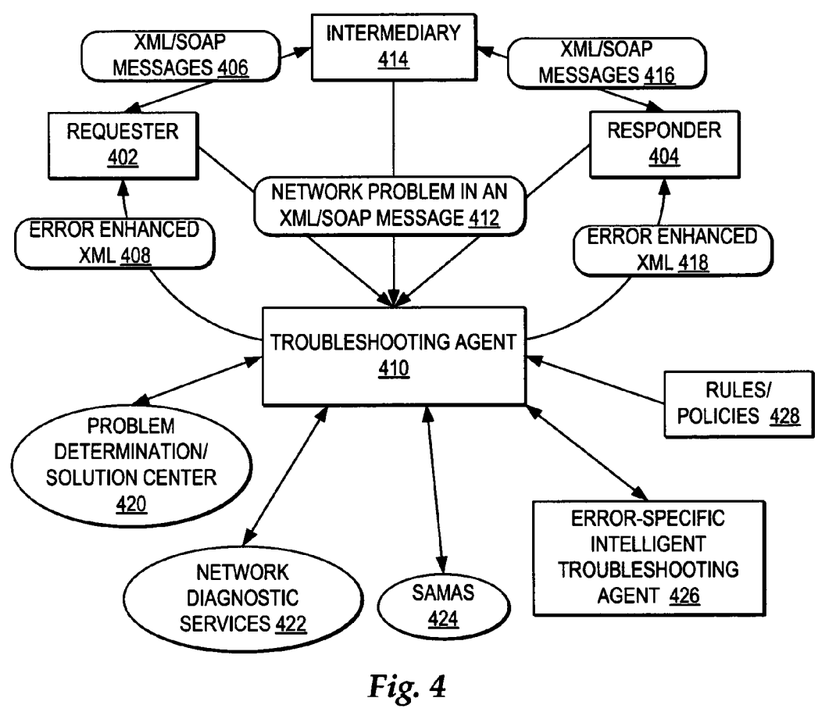
FIG. 4 is a flow diagram depicting the path of message transactions, where error resolution in a message transaction is facilitated by at least one troubleshooting agent.

With reference now to FIG. 4, there is depicted a flow diagram of message transaction, where error resolution in message transactions is facilitated by at least one troubleshooting agent. In particular, grid services, within grid environment 240 and other network environments may communicate using XML. XML is a messaging technology defined by a requester and a responder, where standard and extendable data flows between the requester and responder points.

In general, in one example, a requester 402 communicates with a responder 404 by sending a message transaction in the form of an XML/SOAP message. In particular, requester 402 passes XML/SOAP message 406 to responder 404 and responder 404 passes XML/SOAP message 416 to requester 402, via intermediary 414.

Responses from responder 404 to requester 402 may be categorized as either application specific or non-application specific. According to an advantage of the invention, non-application specific responses which indicate problems are passed to troubleshooting agent 410, relieving the application supporting requester 402 of needing to respond to errors other than errors within the context of the application logic. In the example, the non-application specific response is network problem 412, sent to troubleshooting agent 410 in an XML/SOAP message. Troubleshooting agent 410 then resolves the error with as fine a granularity of error code or message as possible, and returns a response 408 to requester 402, a response 418 to responder 404, or a response to intermediary 414. In an alternate embodiment, requester 402 or intermediary 414 may receive the non-application specific response of network problem 412, and pass network problem 412 to troubleshooting agent 410. Response 408 or 418 may include a detailed error code or may include a trusted routing update of the XML/SOAP message, for example.

As will be further described with reference to FIGS. 7 and 8, network problem 412 is encoded in an XML/SOAP message. Requester 402, responder 404, or intermediary 414 forward network problem 412 to troubleshooting agent 410 by adding a SOAP header that directs network problem 412 to troubleshooting agent 410.

Alternatively, when the message is application-specific, the protocol layer, for example HTTP, handles the error or pushes the error up to the application at requester 402. In one example, the protocol layer assigns an error with a definition from a high level set of error messages or codes that are understood by an application at requester 402.

In particular, at troubleshooting agent 410, the finer granularity of error code or message returned by troubleshooting agent 410 may be more specific than the generic error message or code generated by the protocol. In particular, when the message of network problem 412 is passed to troubleshooting agent 410, troubleshooting agent 410 may specify the error with indicators including, but not limited to, a server is down, that the path on the network is blocked, network traffic is too high, the network has timed out, and other indicators of errors preventing the proper receipt of messages because of network problems.

Troubleshooting agent 410 may determine how to resolve and respond to network problem 412 through rules 428, as will be further described with reference to FIG. 5. Rules 428 may allow troubleshooting agent 410 to distribute network problem 412 and other processes to other services and agents. In one example, troubleshooting agent 410 may distribute network problem 412 to other troubleshooting agents that are able to resolve more specific errors, such as error-specific intelligent troubleshooting agent 426. In addition, troubleshooting agent 410 may distribute network problem 412 to a problem determination and solution center 420 to provide additional diagnostics and steps in providing response 408 and response 418. Further, troubleshooting agent 410 may distribute network problem 412 to a network diagnostic service 422 that checks and verifies the problem using specific network diagnostic tools. Moreover, troubleshooting agent 410 may distribute network problem 412 to a service availability management agent (SAMA) 424 which is an autonomic grid service agent for performing self-healing within a grid environment when the error is a failure of a grid node. For example, U.S. patent application Ser. No. 10/757,270, titled "MANAGING ANALYSIS OF A DEGRADED SERVICE IN A GRID ENVIRONMENT", commonly assigned to International Business Machines Corporation and hereby incorporated herein by reference, describes a SAMA which performs self-healing within a grid environment and may also distribute errors to troubleshooting agents that handle non-application specific protocol level errors, such as troubleshooting agent 410.

Figure 5:
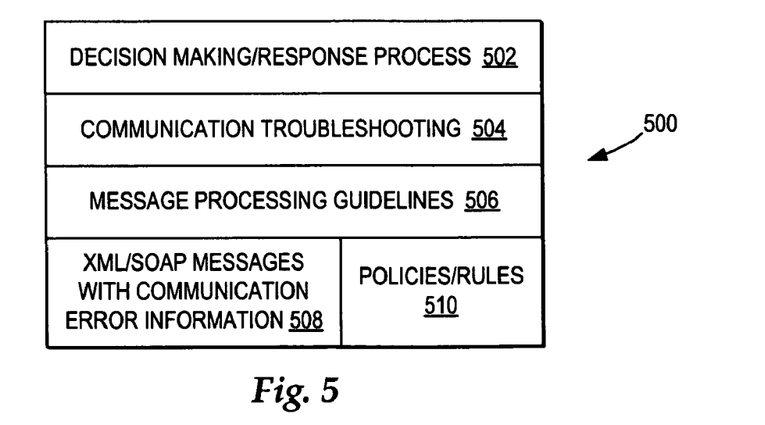
FIG. 5 is a block diagram illustrating an example of the architectural layers of a troubleshooting agent in accordance with the method, system, and program of the present invention.

Referring now to FIG. 5, a block diagram illustrates an example of the architectural layers of a troubleshooting agent in accordance with the method, system, and program of the present invention. As illustrated, a troubleshooting agent architecture 500 includes multiple layers for handling error resolution and creation of more specific error messages. In general, troubleshooting agent 410, implemented through policy-driven troubleshooting agent architecture 500, may be physically implemented in multiple systems including, but not limited to, a SOAP intermediary, a service in a grid environment, a standalone server, or a tightly-coupled cluster of servers.

First, policies and rules 510 is a layer that includes the policies and rules that govern troubleshooting agent 410 and enable the logic required for troubleshooting agent 410 to perform error resolution. As previously described with reference to FIG. 4, policies and rules 510 may be accessed via a network from at least one data storage location, such as rules 428. Policies and rules 510 may include rules defined for any error message or condition which may be raised or occur within a grid environment. Error messages may include ambiguous error indicators, general error indicators, and specific error indicators. In addition, as previously described, error messages advantageously include non-application specific error indicators, however, troubleshooting agent 410 may also handle application specific error indicators if rules and policies 510 includes rules for troubleshooting agent 410 to resolve application specific error indicators.

Figure 6:
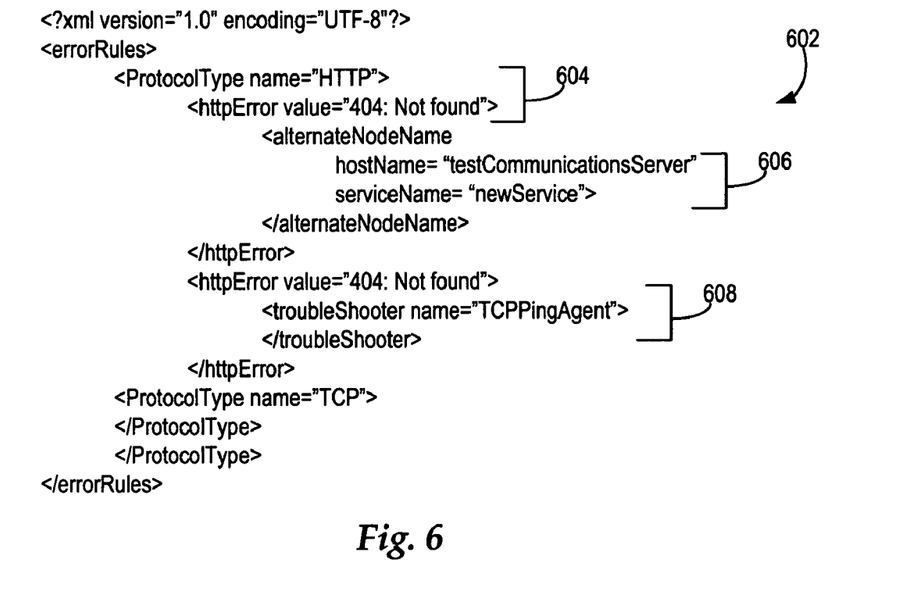
FIG. 6 is a textual example depicting code which defines a rule for error resolution.

With reference to FIG. 6, a textual example of code which defines the rules in policies and rules 510 is depicted. In the example, a coded rule 602 handles the error of "HTTP 404 (Not found)", as illustrated at reference numeral 604. The error of "HTTP 404 (Not found)" is an ambiguous, non-application specific error that would be passed to troubleshooting agent 410. One option for handling the error is troubleshooting agent 410 troubleshooting the path to the host system (responder 404) and either ordering corrective action or providing an alert to an alternate agent responsible for the task, such as the "TCPPingAgent", as described at reference numeral 608. Another option for handling the error, where the communication path works, but the URL needs to be changed, is for troubleshooting agent 410 to perform a trusted update to the requester's message with the new URL; once troubleshooting agent 410 updates the URL to the correct host (responder), then requester 402 and responder 404 could exchange data. For example, as an alternate node for updating a URL is indicated at reference numeral 606.

It will be understood that coded rule 602 provides an illustrative example of a type of rule that may be accessible as part of policies and rules 510. Rules for additional types of errors and additional types of responses may be included in policies and rules 510.

Returning now to FIG. 5, message processing guidelines 506, provides the guidelines for processing of XML/SOAP messages with communication error information 508 by troubleshooting agent 410. In particular, message processing guidelines 506 may include multiple instructions or polices for processing XML/SOAP messages with communication error information 508.

In one example, message processing guidelines 506 includes a general guideline for "how to interpret the XML/SOAP message with communication error information." In one example, the guideline requires that troubleshooting agent 410 must first parse the message to obtain the critical error data, requestor's identity, responder's identity, and application identity. For example, the message is parsed to obtain the error data of "HTTP 404 (not found)". Based on the parsed error message, troubleshooting agent 410 may then analyze polices and rules to determine if troubleshooting agent 410 can achieve a solution or whether troubleshooting agent 410 needs to pass the message to an error-specific or problem-specific troubleshooting agent.

In addition, message processing guidelines 506 includes a more specific guideline for "providing and enabling security capabilities to interpret and change messaging routing and message contents." In one example, the guideline requires that when analyzing a parsed error message, troubleshooting agent 410 determines that to solve the problem, the requester's message contents requires an update. Troubleshooting agent 410 would perform the update, restricted by the security policy that governs the environment of requester 402 or the policy for a grid environment, for example. In one example, troubleshooting agent 410 would perform security policy tasks, such as authentication and assurance of data integrity, by using a digital signature to identify troubleshooting agent 410 and using secure keys to encrypt and decrypt the messages.

Next, message processing guidelines 506 includes a more specific guideline for "interpreting the rules and polices defined for specific error messages." In one example, the guideline requires that troubleshooting agent 410 is controlled by polices and rules 510, which can be statically or dynamically enforced, and adjustable to meet the types of error conditions occurring in a particular grid environment or network environment.

Further, message processing guidelines 506 includes a more specific guideline for "delegating messages to troubleshooters for diagnostic process or forming a troubleshooter hierarchy for different levels of problem solving." In particular, the guideline would allow for troubleshooting agent 410 to pass the error on to another agent, such as error-specific intelligent troubleshooting agent 426, that handles a particular type of error analysis, if troubleshooting agent 410 is not able to resolve the error.

Figure 7:
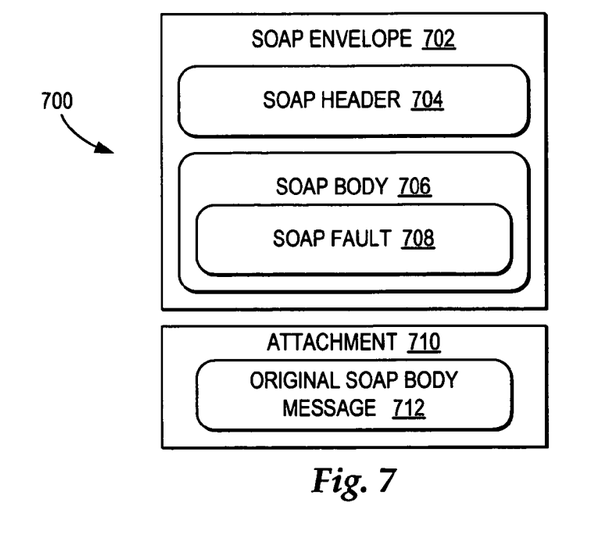
FIG. 7 is a block diagram illustrating the contents of an XML/SOAP message with communication information that is processed according to message processing guidelines.

Referring now to FIG. 7, a block diagram illustrates the contents of an XML/SOAP message with communication information 508 that is processed according to message processing guidelines 506. In the example, attachment 710 to SOAP envelope 702 includes an original SOAP body message 712. In particular, when an error is detected, the entities sending message 508 to troubleshooting agent 410 create SOAP envelope 702 and attaches attachment 710. Attachment 710 includes original SOAP body message 712, which is the unmodified SOAP message original directed to the responder.

SOAP header 704 specifies message processing guidelines 506. In particular, SOAP header 704 specifies the roles that troubleshooting agents can play in error resolution, the message that troubleshooting agents must handle, and the address header with information such as the requester address, destination address, and intermediaries and each entity's role in the message processing.

SOAP body 706 includes SOAP fault 708, which is the error message generated by a communication protocol layer, such as HTTP. In particular, the error message generated by a communication protocol layer is encoded in SOAP body 706.

Figure 8:
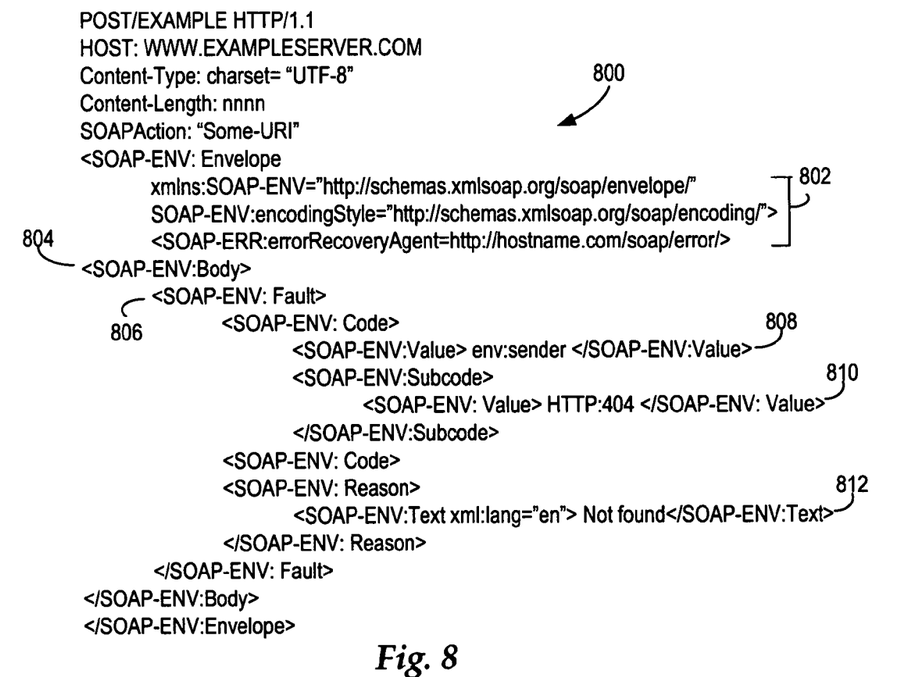
FIG. 8 is a textual example depicting code which represents a SOAP envelope of an XML/SOAP message with communication error information.

With reference now to FIG. 8, there is depicted a textual example of code which represents a SOAP envelope of an XML/SOAP message with communication error information. As illustrated, a SOAP envelope code 800 represents SOAP envelope 702. SOAP envelope code 800 includes header code 802, represented by SOAP header 704. In the example, header code 802 specifies a namespace for the SOAP envelope as "http://schemas.xmlsoap.org/soap/envelope" and a namespace for SOAP encoding as "http://schemas.xmlsoap.org/soap/encoding". In addition, header code 802 includes a namespace for a troubleshooting agent "errorRecoveryAgent" as "http://hostname.com/soap/error".

In addition, SOAP envelope code 800 includes a body code 804 that encodes a fault code 806, representing SOAP body 706 and SOAP fault 708, respectively. In the example, fault code 806 specifies a value code 808 that indicates the error message is from the sender, a value subcode 810 that indicates the protocol error number of "HTTP:404" and a reason code 812 that indicates the reason for the protocol error of "not found".

It will be understood that FIGS. 7 and 8 are merely illustrative examples of one method for enhancing an XML/SOAP message with communication error information, but that other data structures of enhanced SOAP headers, SOAP bodies, and other code enhancements may be implemented in an XML/SOAP message with communication error information. In addition, it will be understood that SOAP envelope code 800 provides an illustrative example of the type of coding which may implement the communication error information of an enhanced XML/SOAP message, but that other coding terms and structures may be implemented.

Returning again now to FIG. 5, communication troubleshooting 504 facilitates the troubleshooting and recovery process through interaction with other troubleshooting providers. In particular, policies and rules 510 for specific errors at troubleshooting agent 410 may require forwarding the error message to another troubleshooting agent able to handle the diagnostic process for the specific type of error, such as error-specific intelligent troubleshooting agent 426. As a result, error-specific troubleshooting agents or a hierarchy of troubleshooting agents process the error message and return a detailed error message or resolve the problem. In one example, a first troubleshooting agent receiving an error message may handle simple problems and delegate more complex problems to another troubleshooting agent in the hierarchy.

In addition, referring to FIG. 5, a decision making and response process 502, handles how to distribute a response to the requester. In particular, based on policies and rules 510, decision making and response process 502 may perform multiple steps to distribute responses. In one example, decision making and response process 502 informs the requester about the problem with as many details as possible so that the requester can made a decision about the message. For example, the requester may decide to reroute the message, cancel the message, or delay the message. In another example, decision making and response process 502 reroutes the message to a destination through a troubleshooting agent recommended route or reroute the message to a new service endpoint. In addition, decision making and response process 502 could pass this portion of the process on to other autonomic agents for more in-depth analysis and response processing. For example, problem determination and solution center 420 provides independent autonomic agents for in-depth analysis and response processing.

Figure 9:
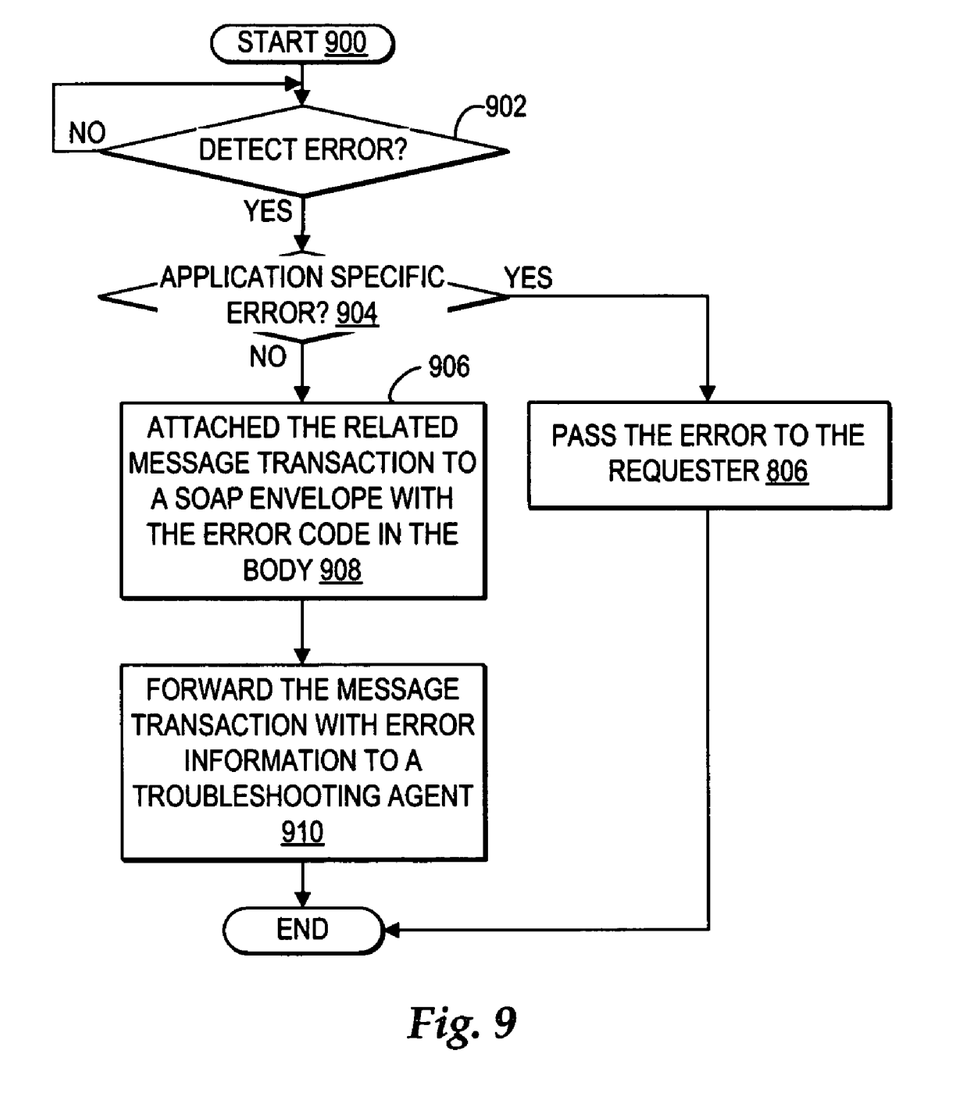
FIG. 9 is a high level logic flowchart depicting a process and program for passing a problem to a troubleshooting agent for resolution.

With reference now to FIG. 9, a high level logic flowchart depicts a process and program for passing a problem to a troubleshooting agent for resolution in accordance with the method, system, and program of the present invention. As illustrated, the process performed by the requester, intermediary, or responder starts at block 900 and thereafter proceeds to block 902. Block 902 depicts a determination whether an error is detected. If an error is detected, then the process passes to block 904. Block 904 illustrates a determination whether the error is application specific. If the error is application specific, then the process passes to block 906. Block 906 depicts passing the error message to the requester or other agent that processes application specific errors. Otherwise, at block 904, if the error is not application specific, then the process passes to block 908. Block 908 depicts applying a SOAP envelope with the error encoded in the body. Next, block 910 illustrates forwarding the XML/SOAP message with error information to a troubleshooting agent, and the process ends.

Figure 10:
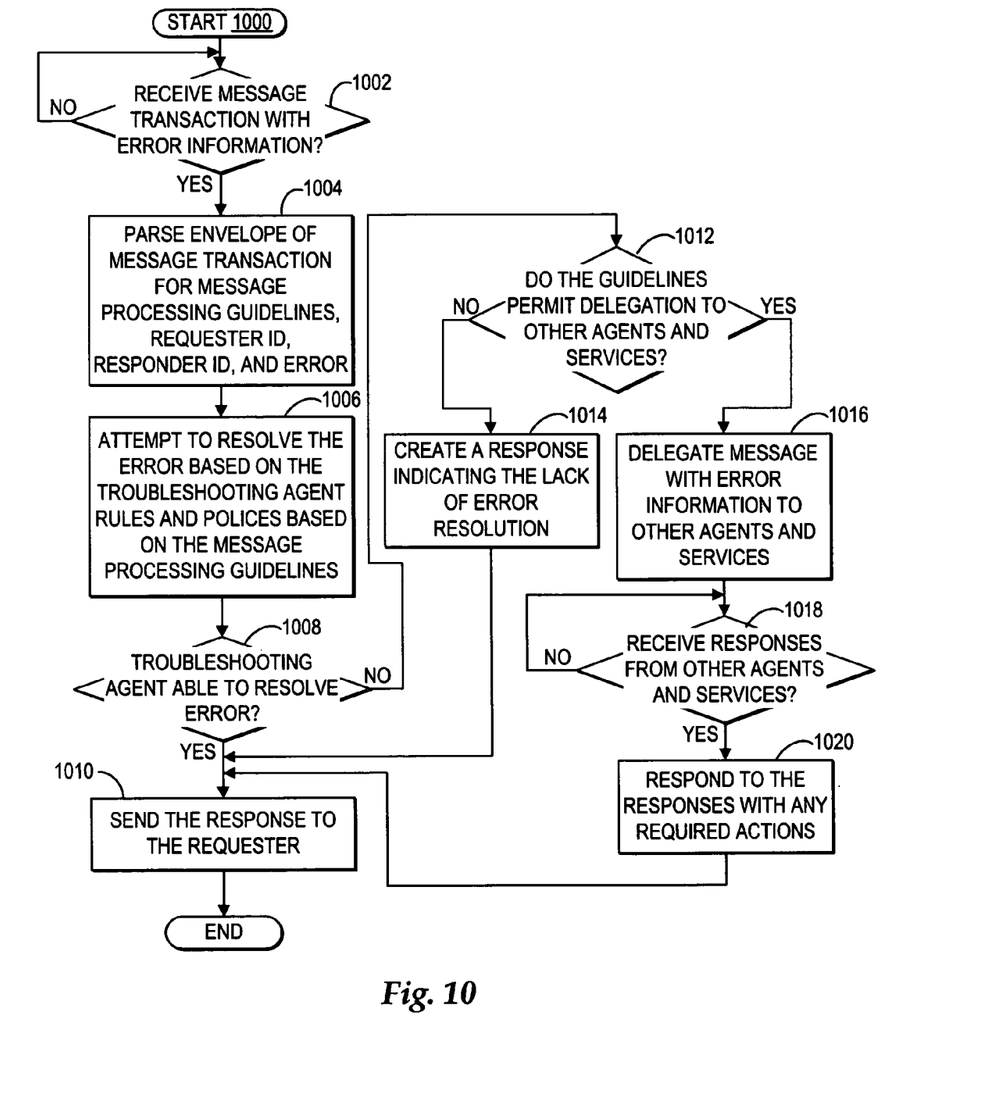
FIG. 10 is a high level logic flowchart depicting a process and program for processing an XML/SOAP message with error information at a troubleshooting agent in accordance with the method, system, and program of the present invention.

Referring now to FIG. 10, a high level logic flowchart illustrates a process and program for processing an XML/SOAP message with error information at a troubleshooting agent in accordance with the method, system, and program of the present invention. As depicted, the process performed by a troubleshooting agent starts at block 1000 and thereafter proceeds to block 1002. Block 1002 depicts a determination whether the troubleshooting agent receives an XML/SOAP message with error information. Once the troubleshooting agent receives an XML/SOAP message with error information, the process passes to block 1004. Block 1004 illustrates parsing the SOAP envelope for the message processing guidelines, requester identity, and responder identity in the header and for the error in the body of the message. Next, block 1006 depicts attempting to solve the error based on the rules and policies, as directed by the message processing guidelines, and the process passes to block 1008.

Block 1008 illustrates a determination whether the troubleshooting agent is able to resolve the error. If the troubleshooting agent is able to resolve the error, then the process passes to block 1010. Block 1010 depicts sending the response to the requester, and the process ends. As previously described, the response may include an updated message or a specific error code and explanation. In addition, the response may include an indicator that the error condition was resolved. Further, as previously described, returning a response may require the troubleshooting agent to take additional steps to resolve the error.

Returning to block 1008, if the troubleshooting agent, through the rules and policies available, is unable to resolve the error, then the process passes to block 1012. Block 1012 depicts a determination whether the message processing guidelines allow the troubleshooting agent to delegate the error message to other troubleshooting agents or services. If the message processing guidelines to do not allow the delegation, then the process passes to block 1014. Block 1014 depicts creating a response indicating the lack of error resolution, and the process passes to block 1010. Otherwise, at block 1012, if the message processing guidelines allow the troubleshooting agent to delegate the error message to other troubleshooting agents or services, then the process passes to block 1016.

Block 1016 depicts passing the error message to another troubleshooting agent or service. Next, block 1018 illustrates a determination whether the troubleshooting agent receives a response of an error diagnosis, error resolution, or system diagnosis. Once the troubleshooting agent receives a response, the process passes to block 1020. Block 1020 depicts responding to the response, and the process passes to block 1010. In particular, responding to the response may require taking decision making steps based on the response, such as updating the URL for the XML/SOAP message.

While the invention has been particularly shown and described with reference to a preferred embodiment, it will be understood by those skilled in the art that various changes in form and detail may be made therein without departing from the spirit and scope of the invention.

What is claimed is:

1. A method for managing non-application specific errors in a network environment, said method comprising:

enabling a grid environment comprising a plurality of computing systems each comprising at least one resource and communicatively connected over a network through a grid management system to share each said at least one resource through a web service layer atop a grid service layer implemented within an open grid services architecture:

enabling XML message transactions through at least one web service within said web service layer between a requester and a responder as facilitated by an intermediary in a network environment;

receiving, at a troubleshooting agent of said grid management system enabled to receive errors from said web service layer and said grid service layer, a particular message transaction forwarded from at least one of said requester, said responder, and said intermediary with a non-application specific protocol level error encoded in a body of a SOAP envelope attached to said message transaction by at least one of said requester, said responder, and said intermediary;

facilitating resolution of said non-application specific protocol level error, from said troubleshooting agent; and distributing a descriptive message indicating said resolution of said non-application specific protocol level error from said troubleshooting agent to at least one of said requester, said responder, and said intermediary.

2. The method according to claim 1 for managing non-application specific errors in a network environment, wherein facilitating resolution of said non-application specific protocol level error further comprises:

facilitating resolution of said non-application specific protocol level error according to at least one rule applied according to at least one message processing guideline.

3. The method according to claim 1 for managing non-application specific errors in a network environment, wherein facilitating resolution of said non-application specific protocol level error, from said troubleshooting agent, further comprises:

delegating said non-application specific protocol level error from said troubleshooting agent to at least one of an error-specific troubleshooting agent and a grid environment service agent at said grid service layer for resolution.

4. The method according to claim 1 for managing non-application specific errors in a network environment, wherein said facilitating resolution of said non-application specific protocol level error further comprises:

performing a trusted update of a routing address for said particular message transaction.

5. The method according to claim 1 for managing non-application specific errors in a network environment, wherein said non-specific application protocol level error is an error that occurs at said network layer that is not understood by an application running at said requester, said responder, and said intermediary.

6. The method according to claim 1 for managing non-application specific errors in a network environment, wherein distributing a descriptive message indicating said resolution of said non-application specific protocol level error from said troubleshooting agent to at least one of said requester, said responder, and said intermediary further comprises:

specifying said descriptive message to indicate a particular network problem occurring at said network layer of at least one from among a server is down, a path on said network is blocked, and said network has timed out.

* * * * *